US008644822B1

(12) United States Patent
Phillips et al.

(10) Patent No.: US 8,644,822 B1
(45) Date of Patent: Feb. 4, 2014

(54) METHOD AND SYSTEM FOR PROVIDING DIFFERENTIATED SERVICES TO MOBILE STATIONS

(71) Applicant: Sprint Spectrum L.P., Overland Park, KS (US)

(72) Inventors: Jeffrey F. Phillips, Overland Park, KS (US); Dorene G. Weiland, Sun City West, AZ (US); Lyle W. Paczkowski, Mission Hills, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/954,286

(22) Filed: Jul. 30, 2013

Related U.S. Application Data

(63) Continuation of application No. 11/436,236, filed on May 18, 2006, now abandoned.

(51) Int. Cl.
*H04W 4/00* (2009.01)
(52) U.S. Cl.
USPC ............... 455/434; 455/432.1; 455/432.2; 455/433; 455/445
(58) Field of Classification Search
USPC ............... 455/434, 432.1, 432.3, 433, 445
See application file for complete search history.

(56) References Cited

U.S. PATENT DOCUMENTS

| | | | |
|---|---|---|---|
| 5,502,757 | A | 3/1996 | Bales et al. |
| 5,926,760 | A | 7/1999 | Khan et al. |
| 6,122,510 | A | 9/2000 | Granberg |
| 6,175,622 | B1 | 1/2001 | Chiniwala et al. |
| 6,654,615 | B1 | 11/2003 | Chow et al. |
| 6,687,495 | B2 | 2/2004 | Bhatia et al. |
| 6,724,876 | B2 | 4/2004 | Williams et al. |
| 6,751,302 | B1 | 6/2004 | Hoang et al. |
| 6,766,009 | B2 | 7/2004 | Williams et al. |
| 6,970,719 | B1 | 11/2005 | McConnell et al. |
| 2002/0122544 | A1 | 9/2002 | Williams et al. |
| 2004/0013255 | A1 | 1/2004 | Williams et al. |
| 2006/0068783 | A1 | 3/2006 | Arduini et al. |
| 2006/0105766 | A1 | 5/2006 | Azada et al. |
| 2006/0174009 | A1* | 8/2006 | Martiquet et al. ............ 709/227 |
| 2006/0206504 | A1* | 9/2006 | Cai et al. ...................... 707/100 |
| 2007/0100981 | A1* | 5/2007 | Adamczyk et al. ........... 709/223 |
| 2007/0104182 | A1 | 5/2007 | Gorti et al. |
| 2008/0010669 | A1* | 1/2008 | Aittola et al. ..................... 726/3 |

* cited by examiner

*Primary Examiner* — Barry Taylor

(57) ABSTRACT

A service profile for a mobile station identifies at least a first set of services that apply when the mobile station is in communication with a first radio access network and a second set of services that apply when the mobile station is in communication with a second radio access network. A service platform, such as an application server, receives a signaling message, e.g., a Session Initiation Protocol (SIP) INVITE message, and the service platform identifies which radio access network is serving the mobile station based on information contained in the signaling message. The service platform then controls the provision of services to the mobile station based on the identified radio access network, in accordance with the service profile.

20 Claims, 2 Drawing Sheets

METHOD AND SYSTEM FOR PROVIDING DIFFERENTIATED SERVICES TO MOBILE STATIONS

CROSS-REFERENCE TO RELATED APPLICATIONS

This application is a continuation of U.S. patent application Ser. No. 11/436,236, filed May 18, 2006, which application is incorporated herein by reference.

BACKGROUND

1. Field of the Invention

The present invention relates to telecommunications and, more particularly, to methods and systems for providing differentiated services to mobile stations.

2. Description of Related Art

Many businesses and other enterprises are increasingly interested in maintaining their own, private wireless telecommunications networks. Such private wireless networks may provide coverage for mobile stations in only a relatively small geographic area, such as the area within and adjacent to the enterprise's offices. For example, the enterprise's wireless coverage area may comprise one or more "picocells" that are provided by one or more base transceiver stations (BTSs), e.g., using CDMA for wireless communication, or by one or more wireless access points, e.g., using 802.11 for wireless communication.

Within the enterprise's private wireless network, authorized mobile stations may be able to originate and receive calls, e.g., via the public switched telephone network (PSTN), as well as communicate with other mobile stations or landline stations within the enterprise network. Such mobile stations may also be able to engage in wireless communication outside of the enterprise's private wireless network, e.g., using a public wireless network. Thus, when a mobile station engaged in a call moves between the coverage area of the enterprise's private wireless network and the coverage area of the public wireless network, it may be possible to handoff the call between the private and public wireless networks.

In one approach for providing such private wireless networks, a wireless service provider may "host" a private wireless network using some of the same network resources as used for the public wireless network. For example, a wireless service provider may use an MSC or "soft MSC" for an enterprise's private wireless network that is also used for the public wireless network. One difficulty with this approach, however, is that different enterprises may want to provide different services, which, in turn, may be different from the services provided in the public wireless network.

Accordingly, there is a need to differentiate the services provided to mobile stations based on which wireless network the mobile stations are operating in.

SUMMARY

In a first principal aspect, an exemplary embodiment of the present invention provides a system for providing differentiated services to a mobile station. The system comprises a first radio access network, a second radio access network, and a service platform for controlling services provided via the first and second radio access networks. The service platform is configured to provide different services to the mobile station depending on whether the mobile station is in communication with the first radio access network or with the second radio access network.

In a second principal aspect, an exemplary embodiment of the present invention provides a method for providing differentiated services to a mobile station. In accordance with the method, a signaling message is received from the mobile station. A radio access network serving the mobile station is identified from information contained in the signaling message. The provision of services to the mobile station is controlled based on the identified radio access network, in accordance with a service profile for the mobile station.

In a third principal aspect, an exemplary embodiment provides, in an Internet Protocol Multimedia Subsystem (IMS) network, a method for providing differentiated services to a mobile station. In accordance with the method, an application server receives a service profile for the mobile station. The service profile identifies at least a first set of services for a first radio access network and a second set of services for a second radio access network. The application server receives a signaling message via a serving call session control function (S-CSCF). The signaling message requests a communication session involving the mobile station. The application server identifies a radio access network serving the mobile station based, at least in part, on information contained in the signaling message. The application server applies the first set of services if the identified radio access network is the first radio access network but applies the second set of services if the identified radio access network is the second radio access network.

DETAILED DESCRIPTION OF EXEMPLARY EMBODIMENTS

1. Overview

Figure 1:
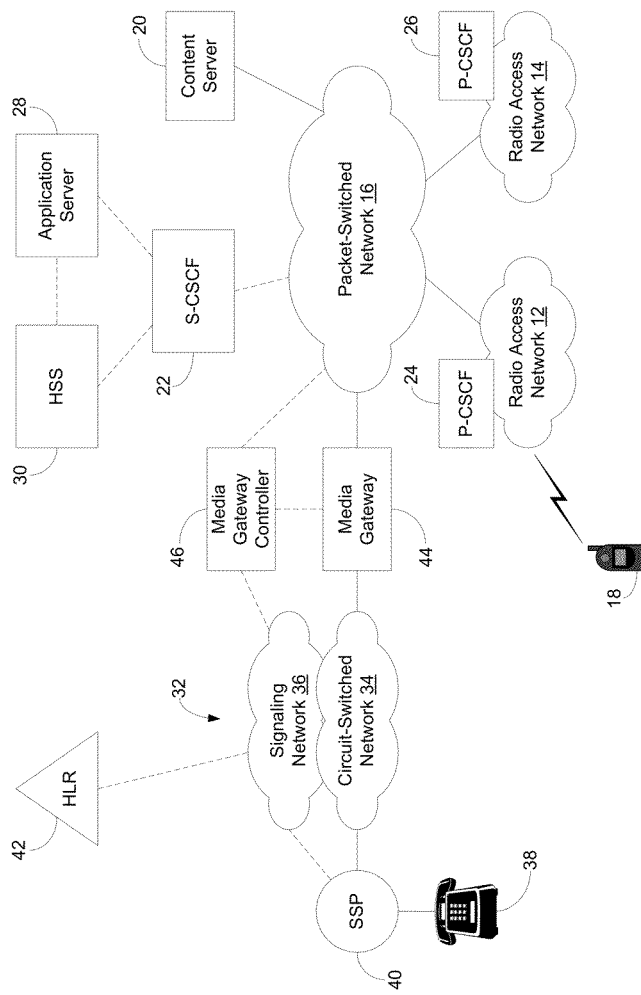
FIG. 1 is a block diagram of a telecommunications network, in accordance with an exemplary embodiment of the present invention.

The present invention, in its exemplary embodiments, can be used to provide different services to a mobile station, depending on which radio access network the mobile station is using for wireless communication. Thus, when the mobile station is in communication with a first radio access network a first set of services may be applied, and when the mobile station in communication with a second radio access network, a second set of services may be applied. The first and second radio access networks may be differentiated based on scope of access. For example, one radio access network may be a public wireless network and the other radio access network may be a private wireless network. Alternatively or additionally, the first and second radio access networks may be differentiated based on wireless access technology. For example, one radio access network may be a wireless wide area network (WWAN) and the other radio access network may be a wireless local area network (WLAN).

The first and second set of services may be differentiated, for example, with respect to what databases, resources, or applications the mobile station is able to access. The service differentiation may be based on whether the mobile is in communication with a public wireless network or a private wireless network. As one example, the mobile station may have access to confidential databases or proprietary applications while on the private wireless network but not have such access while on the public wireless network. As another example, the mobile station may have access to resources such as streaming video while on the public wireless network but not have access to such resources while on the private wireless network.

The first and second set of services may also include different services for voice calls, e.g., different call origination services and/or call termination services. For example, calls to certain numbers, such as "900" numbers, might be blocked when the mobile station is using the private wireless network but not when the mobile station is using the public wireless network.

A service platform may control the provision of services to a mobile station such that the service platform provides different services depending on which radio access network is serving the mobile station. The service platform may control the provision of services to the mobile station based on a service profile of the mobile station. For example, the mobile station may be associated with different service profiles for different radio access networks. Alternatively, the mobile station may be associated with a service profile that identifies different services for different radio access networks.

Thus, in one approach, the service platform may obtain a service profile for the mobile station that is dependent on the mobile station's radio access network. For example, when the mobile station registers via a first radio access network, the service platform may obtain a first service profile that identifies a first set of services, and when the mobile station registers via a second radio access network, the service platform may obtain a second service profile that identifies a second set of services. The service platform may determine the mobile station's radio access network from information contained in the mobile station's registration message.

In another approach, the service platform may refer to a service profile that identifies different services for different radio access networks. When the service platform receives a signaling message regarding a mobile station, the service platform may identify which radio access network is serving the mobile station based on information contained in the signaling message. The service platform then controls the provision of services to the mobile station based on the set of services in the mobile station's service profile that apply to the identified radio access network.

In an exemplary embodiment, the service platform is an application server in an Internet Protocol Multimedia Subsystem (IMS) network. Relevant aspects of the IMS approach are described in 3$^{rd}$ Generation Partnership Project, "IP Multimedia System (IMS)," 3GPP TS 23.228, v7.1.0 (2005-9), which is incorporated herein by reference. In accordance with the IMS approach, the Session Initiation Protocol (SIP) may be used for signaling. Relevant aspects of SIP are described in J. Rosenberg et al., "SIP: Session Initiation Protocol," Request for Comments 3261, June 2002, which is incorporated herein by reference. The SIP signaling may use the Session Description Protocol (SDP) to describe the communication sessions that are being set up or managed. Relevant aspects of SDP are described in M. Handley, et al., "SDP: Session Description Protocol," Request for Comments 2327 (April 1998), which is incorporated herein by reference.

In the IMS approach, one or more application servers control the provisioning of services to mobile stations by sending and receiving SIP messages via a serving call session control function (S-CSCF). A mobile station may send and receive the SIP messages via a proxy call session control function (P-CSCF) that serves a particular radio access network. For example, to request a communication session, a mobile station may send a SIP INVITE message to the P-CSCF, and the P-CSCF may forward the SIP INVITE message to the S-CSCF. The S-CSCF may apply filtering criteria to determine that the SIP INVITE message should be forwarded to an application server to apply services. The application server may then provide services based on the radio access network serving the mobile station.

The application server may provide radio access network-dependent services by determining which radio access network is serving the mobile station. The application server may determine the radio access network based, at least in part, on information contained in the SIP INVITE message. Such information may include, for example, an IP address, port number, SIP Uniform Resource Identifier (URI), and/or domain name associated with a particular radio access network. The information could be part of the source address of the data packet containing the SIP INVITE message. Alternatively, the information could be contained in a field of the SIP INVITE message, e.g., a "From" field, a "Contact" field, a "Via" field, or a "Record-Route" field. The IP address or other information may correspond to a network element, such as a P-CSCF, that is specific to a particular radio access network. Once the application server identifies the radio access network serving the mobile station, the application server may refer to a service profile of the mobile station to determine which services apply for the identified radio access network.

As an alternative to determining which radio access network is serving a mobile station for each SIP INVITE message that the application server receives for that mobile station, the application server may instead determine the radio access network at the time of registration and then apply a service profile that is specific to that radio access network. For example, the application server may receive a SIP REGISTER message from a mobile station and identify which radio access network the mobile station is communicating from based, at least in part, on information contained in the SIP REGISTER message. The application server may then request a service profile that is specific for the identified radio access network, for example, from a home subscriber server (HSS). When the application server subsequently receives a SIP INVITE message relating to the mobile station, the application server may then refer to that service profile to determine which services apply.

In this way, different services may be provided to a mobile station depending on which radio access network the mobile station is using for communication. This allows the services available on particular radio access networks, e.g., private wireless networks, to be customized for particular enterprises. For example, an operator of a public wireless network may "host" a private wireless network for an enterprise with services on the private wireless network that are tailored to that particular enterprise. A mobile station may then be able to operate in both the public wireless network, using the public network services, and in the private wireless network, using the private network services.

2. Exemplary Network Architecture

FIG. 1 is a block diagram of an exemplary telecommunications network 10, in which exemplary embodiments of the present invention may be employed. In FIG. 1, connections that carry primarily voice or other media are shown as solid lines and connections that carry primarily signaling are shown as dashed lines.

Telecommunications network 10 includes a plurality of radio access networks, exemplified by radio access networks 12 and 14, which may be communicatively coupled to a packet-switched network 16. Radio access networks 12 and 14 provide wireless communication services to mobile stations, such as mobile station 18, within respective wireless coverage areas, which could be overlapping. The wireless communication services may involve mobile stations transmitting and/or receiving voice, video, data or other media via an air interface. The mobile stations could be, for example, wireless telephones, wireless personal digital assistants, wirelessly-equipped laptop computers, or other wireless communication devices.

Radio access networks 12 and 14 could be, for example, wireless wide area networks (WWANs) or wireless local area networks (WLANs), or one could be a WWAN and the other a WLAN. As a WWAN, a radio access network may include one or more base transceiver stations (BTSs), which may communicate with mobile stations via an air interface format such as CDMA, EV-DO, or GSM/GPRS. The BTSs may be controlled by one or more base station controllers (BSCs), and the BSCs may be communicatively coupled to packet-switched network 16 via a packet data serving node (PDSN).

As a WLAN, a radio access network may include one or more wireless access points, which may communicate with mobile stations via an air interface format such as IEEE 802.11, IEEE 802.16, HomeRF, HiperLAN, or Bluetooth. The wireless access points may be connected to a local area network (LAN), which may be communicatively coupled to packet-switched network 16 via a network access device, such as a cable modem, DSL modem, or router.

Radio access networks 12 and 14 could be public wireless networks or private wireless networks, or one could be a public wireless network and the other a private wireless network. A private wireless network may be operated for a particular enterprise and may provide access to only those mobile stations that are associated with that enterprise. A private wireless network might have only a limited wireless coverage area, such as a particular building, part of a building, or complex of buildings, that corresponds to the area used by the enterprise. A public wireless network may provide more general access to mobile stations and may encompass a larger geographic area.

A mobile station may be able to use different radio access networks for wireless communication. For example, when mobile station 18 is operating in an area served by radio access network 12, as shown in FIG. 1, mobile station 18 may use radio access network 12 for wireless communication. However, mobile station 18 may move to an area served by radio access network 14 and then use radio access network 14 for wireless communication. In some cases, a handoff may be effected as mobile station 18 moves between radio access networks, so that a communication session begin via one radio access network may be continued via the other radio access network.

Packet-switched network 16 may be a wide area network that routes packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 16 in a real-time format. Other protocols, such as SIP, may be used to set up and/or manage communication sessions through packet-switched network 16. In an exemplary embodiment, packet-switched network 16 includes the Internet and/or one or more private networks.

In an exemplary embodiment, SIP is used to set up communication sessions through packet-switched network 16, in accordance with the IMS approach. Such communication sessions may include voice sessions, for example, between mobile station 18 and another telephony endpoint. Such communication sessions may also include sessions in which data, video, or other media is exchanged between a mobile station and another endpoint. For example, mobile station 18 may communicate with different types of servers via packet-switched network 16, as exemplified in FIG. 1 by content server 20. In one example, content server 20 could be a file server from which mobile station 18 may access databases or retrieve files. In another example, content server 20 could be a Web server from which mobile station 18 may obtain content using the HyperText Transfer (HTTP) protocol. In yet another example, content server 20 could be a media server that delivers media such as streaming video to mobile station 18. Mobile stations, such as mobile station 18, may also be able to access other types of servers via packet-switched network 16.

In accordance with the IMS architecture, the communication sessions may be controlled by a serving call session control function (S-CSCF) 22. S-CSCF 22, in turn, may communicate with an endpoint, such as mobile station 18, via a proxy call session control function (P-CSCF). In an exemplary embodiment, each radio access network includes a respective P-CSCF. Thus, radio access networks 12 and 14 may include P-CSCFs 24 and 26, respectively.

In the IMS approach, S-CSCF 22 may control communication sessions by invoking service logic located in one or more application servers, such as application server 28. For example, when S-CSCF 22 receives a SIP INVITE message regarding a communication session, S-CSCF 22 may forward the SIP INVITE message to application server 28. Application server 28 may provide a response that controls whether or how the communication session is established. In this way, application server 28 may control the provision of services to endpoints such as mobile station 18.

To determine what services are available to mobile station 18, application server 28 may refer to a service profile for mobile station 18. Application server 28 may obtain a service profile for mobile station 18 from a home subscriber server (HSS) 30, e.g., when mobile station 18 registers with S-CSCF 22. The service profile could be specific for a particular radio access network, such as radio access network 12. Alternatively, the service profile could identify different sets of services for different radio access networks, e.g., one set of services for radio access network 12 and another set of services for radio access network 14.

The communication sessions controlled by S-CSCF 22 may also extend through a legacy telecommunications network 32, such as the public switched telephone network (PSTN), which uses an out-of-band signaling system, such as Signaling System 7 (SS7) to route circuit-switched calls. Thus, legacy network 32 may include a circuit-switched network 34 that carries bearer traffic, i.e., the voice or other media in calls, and a signaling network 36 that carries signaling traffic used to set up, tear down, monitor, and control calls. Circuit-switched network 34 may include a plurality of trunks, with each trunk carrying media in a time division multiplex (TDM) format. Signaling network 36 may include a plurality of networked signal transfer points (STPs).

Legacy network 32 may be connected to various types of telephony endpoints. For example, legacy network 32 may be connected to landline stations, such as landline telephone 38, via switching systems, such as service switching point (SSP) 40. SSP 40 may have a bearer connection to circuit-switched network 34 and a signaling connection to signaling network 36. Although FIG. 1 shows legacy network 32 connected to only one landline station via one SSP, it is to be understood that network 32 could be connected to multiple landline stations via multiple SSPs.

In addition, legacy network 32 could be connected to mobile switching centers (MSCs) that provide wireless telecommunications services to mobile stations via WWANs. To support such wireless telecommunications service, the MSCs may communicate with a home location register (HLR) 42 via signaling network 36, e.g., using IS-41 signaling.

Legacy network 32 may be communicatively coupled to packet-switched network 16 via a media gateway 44 and a media gateway controller 46. For communication sessions that extend through both legacy network 32 and packet-switched network 16, media gateway 44 may convert the media exchanged in the session between the TDM or other format used in circuit-switched network 34 and the RTP or other format used in packet-switched network 16.

Media gateway controller 46 may control media gateway 44, e.g., using the Media Gateway Control Protocol (MGCP) or H.248/Megaco. Media gateway controller 46 may also be communicatively coupled to signaling network 36 and to packet-switched network 16 in order to convey the signaling used to set up communication sessions through media gateway 44. For example, media gateway controller 46 may engage in SS7 signaling via signaling network 36 and engage in SIP signaling via packet-switched network 16.

Media gateway 44 and media gateway controller 46 may function together as a "soft MSC" that serves one or more radio access networks via packet-switched network 16, e.g., radio access networks 12 and 14. For example, media gateway controller 46 may communicate with HLR 42 using IS-41 signaling so as to appear as an MSC to HLR 42. Thus, when mobile station 18 is in communication with radio access network 12 or 14, HLR 42 may view mobile station 18 as being served by media gateway controller 46, and calls to mobile station 18 originating from legacy network 32, such as from landline telephone 38, may be routed to media gateway controller 46. However, in accordance with the IMS approach, application server 28 may control the services provided to mobile station 18. As described below, those services may depend on whether mobile station 18 is in communication with radio access network 12 or with radio access network 14.

3. Exemplary Operation

Figure 2:
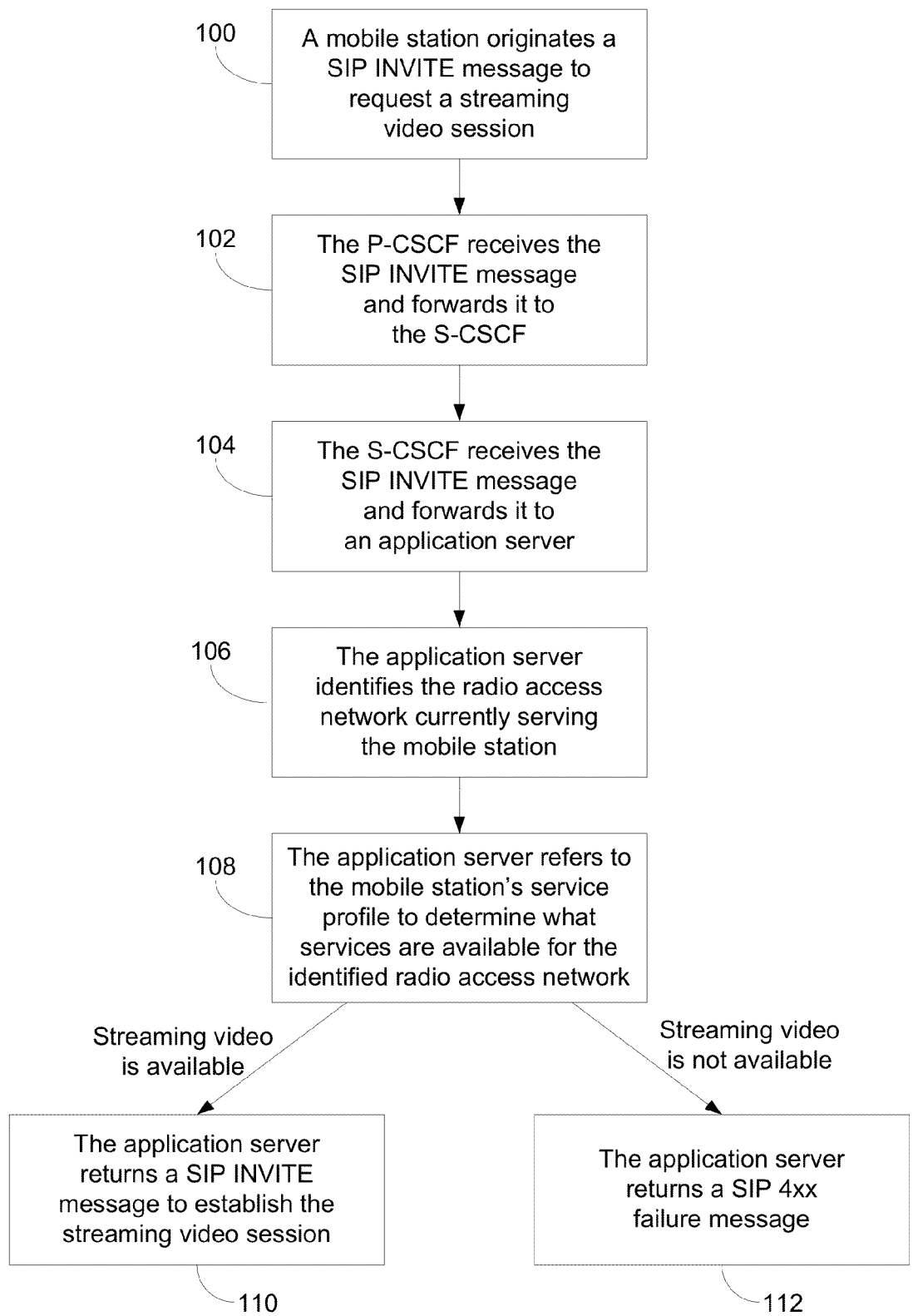
FIG. 2 is a flow chart illustrating a method of providing differentiated services to a mobile station, in accordance with an exemplary embodiment of the present invention.

FIG. 2 is a flow chart illustrating an exemplary method of operation. More particularly, FIG. 2 illustrates an example in which a mobile station requests a streaming video session and an application server in an IMS network determines whether to allow the request given the services available for the radio access network currently serving the mobile station. Although a streaming video session is being requested in this example, it is to be understood that the mobile station might request other types of sessions in other examples. In addition, the example of FIG. 2 assumes an IMS architecture, as illustrated in FIG. 1. However, other network architectures could be used.

The process may begin when a mobile station, e.g., mobile station 18 in communication with radio access network 12, originates a SIP INVITE message that requests a streaming video session, as indicated by block 100. In this example, it is assumed that prior to transmitting the SIP INVITE message the mobile station has discovered P-CSCF 24 as the local proxy and has already registered with S-CSCF 22.

The P-CSCF receives the SIP INVITE message and forwards it to the S-CSCF, as indicated by block 102. In so doing, the P-CSCF may add information to the SIP INVITE message, for example, in a "Via" or "Record-Route" field. The S-CSCF receives the SIP INVITE message and forwards it to an application server, e.g., application server 28, as indicated by block 104.

The application server then identifies the radio access network currently serving the mobile station, as indicated by block 106. In this example, the application server may determine that radio access network 12 is currently serving mobile station 18, as shown in FIG. 1. The application server may make this identification based, at least in part, on information contained in the SIP INVITE message. Such information may include, for example, an IP address, port number, domain name, or SIP URI that corresponds to a particular radio access network. For example, if the P-CSCF added its IP address and port number to the SIP INVITE message, then the application server might determine the radio access network based on the P-CSCF that sent the message.

The application server may then refer to the mobile station's service profile to determine what services are available for the identified radio access network, as indicated by block 108. The application server may have obtained the service profile, e.g., from HSS 30, when the mobile station registered with the S-CSCF. The service profile may specify different sets of services that are available for different radio access networks. For example, the service profile may identify one set of services as being available when mobile station 18 is in communication with radio access network 12 and another set of services as being available when mobile station 18 is in communication with radio access network.

How the application server responds may depend on whether the requested streaming video session is an available service for the identified radio access network, i.e., radio access network 12, according to the mobile station's service profile. If streaming video is available, then the application server may return a SIP INVITE message to the S-CSCF in order to establish the streaming video session, as indicated by block 110. Thus, the S-CSCF may then send the SIP INVITE to the appropriate media server, e.g., content server 20.

On the other hand, if streaming video is not available, the application server may return a SIP 4xx failure message to the S-CSCF, as indicated by block 112. The mobile station may then receive the failure message via the P-CSCF. However, the requested streaming video session may not be available simply because the mobile station is in communication with radio access network 12. For example, radio access network 12 may be a private wireless network for an enterprise that has a policy against high-bandwidth uses of radio resources. If, however, the mobile station were to move into a different area and begin using radio access network 14 for wireless communication, the outcome might be different. For example, radio access network 14 might be a public wireless network for which the mobile station user has subscribed to streaming video services. Thus, if the mobile station were to send a SIP INVITE message via radio access network 14 to request the same streaming video session, the application server may approve it.

Although FIG. 2 illustrates an example of an application server applying radio access network-dependent services for a request to originate a communication session from a mobile station, an application server can also apply radio access network-dependent services for a request to terminate a communication session to a mobile station. For example, landline telephone 38 may call a directory number associated with mobile station 18 when mobile station 18 is in communication with radio access network 12. Because media gateway controller 46 serves radio access network 12, the signaling for the call is routed through signaling network 36 to media gateway controller 46. For example, HLR 42 may maintain a mobility management record for mobile station 18 that indicates that media gateway controller 46 is the "soft MSC" currently serving mobile station 18. Thus, in response to an IS-41 LOCREQ message to locate mobile station 18, HLR 42 may return routing instructions to route the call to media gateway controller 46.

In response to receiving the SS7 signaling for the call via signaling network 36, media gateway controller 46 may transmit a SIP INVITE message to S-CSCF 22 via packet-switched network 16. S-CSCF 22 may then forward the SIP INVITE message to application server 28. The information contained in the SIP INVITE message may indicate to application server 28 that mobile station 18 as the intended recipient. Application server 28 may further determine that radio access network 12 is currently serving mobile station 18, for example, based on the prior SIP registration of mobile station 18. Application server 28 may then refer to the service profile for mobile station 18 to determine what call termination services apply for radio access network 12. Such call termination services may include, for example, call forwarding conditions. For example, if radio access network 12 is an enterprise's private wireless network, the call termination services for radio access network 12 may specify call forwarding to an office phone in the enterprise in response to a busy or no-answer condition.

If, on the other hand, mobile station 18 were in communication with radio access network 14, the call would still be routed to media gateway controller 46. This is because, from the perspective of HLR 42, media gateway controller 46 is the "soft MSC" that serves both radio access network 12 and radio access network 14. Nonetheless, application server 28 may apply different call termination services. For example, radio access network 14 may be a public wireless network. In that case, the call termination services for radio access network 14 may specify call forwarding to a voicemail system, rather than to an office phone, in response to a busy or no-answer condition.

In this way, different services can be provided to a mobile station depending on which radio access network the mobile station is using for wireless communication. This can beneficially enable an enterprise to customize the services available to mobile stations using its private wireless network, while still allowing mobile stations users to access their own services when using the public wireless network.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
    receiving, by an application server, a request message from a mobile station, wherein the request message requests a particular type of communication service, wherein the application server receives the request message via a serving call session control function (S-CSCF), and wherein the application server is configured to control services provided to mobile stations via a plurality of radio access networks;
    receiving, by the application server, a service profile for the mobile station from a home subscriber server (HSS);
    identifying, by the application server, a particular radio access network in the plurality of radio access networks as currently serving the mobile station;
    determining, by the application server, a responsive message based on the service profile and the particular radio access network, wherein determining the responsive message comprises determining whether the particular type of communication service is available for the particular radio access network according to the service profile; and
    sending, by the application server, the responsive message to the S-CSCF.

2. The method of claim 1, wherein the particular type of communication service is a streaming video service.

3. The method of claim 1, further comprising:
    determining, by the application server, that the particular type of communication service is not available for the particular radio access network according to the service profile.

4. The method of claim 3, wherein the responsive message is a failure message.

5. The method of claim 3, wherein the service profile indicates that the particular type of communication service is not available for the particular radio access network but is available for a different radio access network in the plurality of radio access networks.

6. The method of claim 1, further comprising:
    determining, by the application server, that the particular type of communication service is available for the particular radio access network according to the service profile.

7. The method of claim 6, wherein the responsive message is configured to establish a communication session.

8. The method of claim 6, wherein the service profile indicates that the particular type of communication service is available for the particular radio access network but is not available for a different radio access network in the plurality of radio access networks.

9. The method of claim 1, wherein the request message and the responsive message are Session Initiation Protocol (SIP) messages.

10. The method of claim 9, wherein the request message is a SIP INVITE message.

11. The method of claim 10, wherein the application server identifies the particular radio access network based, at least in part, on network-specific information contained in the SIP INVITE message.

12. The method of claim 11, wherein the network-specific information includes information added by a proxy call session control function (P-CSCF) associated with the particular radio access network.

13. The method of claim 1, wherein the plurality of radio access networks includes a wireless wide area network (WWAN) and a wireless local area network (WLAN).

14. The method of claim 1, wherein the plurality of radio access networks includes a public wireless network and a private wireless network.

15. The method of claim 1, wherein each of the plurality of radio access networks is associated with a respective proxy call session control function (P-CSCF).

16. The method of claim 1, wherein the mobile station is operable for wireless communication with each of the plurality of radio access networks.

17. A system, comprising:
    a home subscriber server (HSS);
    a serving call session control function (S-CSCF); and an application server for controlling services provided to mobile stations via a plurality of radio access networks, wherein the application server is configured to (i) receive a request message from a mobile station via the S-CSCF, the request message requesting a particular type of communication service, (ii) receive a service profile for the mobile station from the HSS, (iii) identify a particular radio access network in the plurality of radio access networks as currently serving the mobile station, (iv) determine a responsive message based on whether the particular communication service is available for the particular radio access network according to the service profile, and (v) send the responsive message to the S-CSCF.

18. The system of claim 17, wherein the request message is a Session Initiation Protocol (SIP) INVITE message.

19. The system of claim 18, wherein the responsive message is a SIP INVITE message based on the particular communication service being available for the particular radio access network according to the service profile.

20. The system of claim 18, wherein the responsive message is a SIP 4xx failure message based on the particular communication service being unavailable for the particular radio access network according to the service profile.

* * * * *